United States Patent
Kie et al.

(10) Patent No.: US 9,917,493 B2
(45) Date of Patent: Mar. 13, 2018

(54) METHOD FOR FIXING PERMANENT MAGNETS OF ROTOR

(71) Applicants: Hyundai Motor Company, Seoul (KR); Kia Motors Corporation, Seoul (KR)

(72) Inventors: Jae Young Kie, Gyeonggi-do (KR); Kwang Kyeong Sung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/204,095

(22) Filed: Jul. 7, 2016

(65) Prior Publication Data

US 2016/0329785 A1 Nov. 10, 2016

Related U.S. Application Data

(62) Division of application No. 13/954,039, filed on Jul. 30, 2013, now Pat. No. 9,413,212.

(30) Foreign Application Priority Data

Feb. 5, 2013 (KR) .................. 10-2013-0012919

(51) Int. Cl.
- *H02K 15/02* (2006.01)
- *H02K 15/10* (2006.01)
- *H02K 15/03* (2006.01)

(52) U.S. Cl.
CPC ........ *H02K 15/03* (2013.01); *Y10T 29/49012* (2015.01); *Y10T 29/53143* (2015.01)

(58) Field of Classification Search
CPC ........ H02K 15/03; H02K 15/12; H02K 1/276; H02K 1/27; Y10T 29/49012; Y10T 29/53143; Y10T 29/49009
USPC ......... 29/598, 423, 455.1, 596, 603.13, 732; 310/156.53, 216.013, 216.043, 216.046, 310/216.047, 216.063
See application file for complete search history.

(56) References Cited

U.S. PATENT DOCUMENTS 7,893,591 B2   2/2011   Myojin
9,608,485 B2 *  3/2017   Yamagishi ........... H02K 1/2766

FOREIGN PATENT DOCUMENTS

| JP | 11-355985 | 12/1999 |
|---|---|---|
| JP | 2001352702 | * 12/2001 |
| JP | 4414417 | 3/2008 |
| JP | 4708445 | 5/2008 |
| JP | 2009-240111 | 10/2009 |
| JP | 2010-063285 | 3/2010 |
| JP | 2010268682 | 11/2010 |
| KR | 10-2000-0039493 | 7/2000 |

* cited by examiner

*Primary Examiner* — Thiem Phan
(74) *Attorney, Agent, or Firm* — Mintz Levin Cohn Ferris Glovsky and Popeo, P.C.; Peter F. Corless

(57) ABSTRACT

A molding apparatus and method for fixing permanent magnets in a rotor core during production of drive motors for environmental vehicles, in which the permanent magnets, which are inserted into magnet insertion apertures of the rotor core, are aligned at identical positions with respect to the axial direction of the rotor core, thus contributing to an improvement in the performance of the drive motors.

6 Claims, 5 Drawing Sheets

METHOD FOR FIXING PERMANENT MAGNETS OF ROTOR

CROSS-REFERENCE TO RELATED APPLICATION

This application is a divisional application of U.S. application Ser. No. 13/954,039, filed Jul. 30, 2013 which claims under 35 U.S.C. § 119(a) the benefit of Korean Patent Application No. 10-2013-0012919 filed Feb. 5, 2013, the entire contents of which are incorporated herein by reference.

BACKGROUND (a) Technical Field

The present invention relates to a molding apparatus and method for fixing permanent magnets of a rotor. More particularly, the present invention relates to an apparatus and method for fixing permanent magnets in a rotor core during production of drive motors for environmental vehicles.

(b) Background Art

Drive motors are used as a power source in environmental vehicles such as hybrid vehicles and electric vehicles. Like typical motors, the key components of the drive motor include a stator, in which a coil is wound on a stator core, and a rotor disposed inside the stator. A rotor can best be defined as a structure in which permanent magnets are inserted into a rotor core.

More specifically, an Nd—Fe permanent magnet synchronous motor is mainly used as the drive motor to allow the drive motor to be mounted in a limited amount of space within an engine room of a vehicle, and the permanent magnets are fixed in a rotor core made of a non-oriented electrical steel sheet.

Conventionally, in order to fix the permanent magnets in the rotor core for the drive motor, a method of applying an adhesive to the permanent magnets or to magnet insertion apertures (into which the permanent magnets are to be inserted) of the rotor core, inserting the permanent magnets into the magnet insertion apertures, and then curing the adhesive or a method of injecting a resin into the magnet insertion apertures of the rotor core, into which the permanent magnets are inserted, and then curing the resin is generally used.

FIG. 1A shows a schematic diagram illustrating a process of disposing a rotor core, into which permanent magnets are inserted, between an upper mold and a lower mold and injecting a resin into a space between the rotor core and the permanent magnets and FIG. 1B is a perspective view illustrating the problems associated with the rotor core in which the permanent magnets are embedded by the related art method.

As shown in FIGS. 1A-B, when a rotor core 15 into which permanent magnets are inserted is disposed into an upper mold 11 and a lower mold 12 and a resin is injected into a space between the rotor core 15 and the permanent magnets 17 through the lower mold 12 (or upper mold) so that the permanent magnets 17 are fixed in the rotor core 15 according to the related art, the positions of the permanent magnets 17 arranged in the circumferential direction of the rotor core 15 do not coincide with each other in the axial direction of the rotor core.

Typically, the permanent magnets to be inserted into the rotor core are smaller than the magnet insertion apertures of the core. The reason for this is to facilitate the insertion of the permanent magnets, to prevent the surface coating, which his applied to increase the corrosion resistance, of the permanent magnet from being damaged by fire, and in particular to form a gap between the permanent magnets and the rotor core, thus providing an area for the injection of adhesive or resin. Moreover, the reason that the size of the permanent magnet is smaller than that of the magnet insertion aperture with respect to the axial direction of the rotor core is to prevent the permanent magnets from being broken by components to be connected to both sides of the core subsequently.

Accordingly, when the permanent magnets 17 are fixed in the magnet insertion apertures 16 of the rotor core 15 using resin according to the related art, as shown in FIG. 1, the positions of the permanent magnets 17 inserted into the magnet insertion apertures 16 may not always be the same, and it is difficult to control the flow of the resin injected into the magnet insertion apertures 16 in an orderly manner. Thus, the positions of the permanent magnets 17 inserted into the magnet insertion apertures 16 of the rotor core 15 may not coincide with each other.

As such, when the positions of the permanent magnets fixed in the rotor core do not coincide with each other in the axial direction, the motor control performance is deteriorated due to imbalance of a rotor assembly, and electromagnetic noise increases as a result. Moreover, it is necessary to add a process for reducing the unbalance of the rotor assembly to rectify the above-described problems, which results in an increase in costs associated with manufacturing a motor.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a molding apparatus and method for fixing permanent magnets of a rotor. More particularly, an apparatus and method are described for fixing permanent magnets in a rotor core, in which a fixing member for fixing the positions of permanent magnets is provided in a mold for injecting a rein into magnet insertion apertures of a rotor core so that the permanent magnets inserted into the magnet insertion apertures are aligned in the same positions with respect to the axial direction of the rotor core, thus contributing to an improvement in the performance of drive motors.

In one aspect, the present invention provides a molding apparatus for fixing permanent magnets of a rotor, the apparatus comprising: an upper mold for supporting an upper side of a rotor core into which permanent magnets are being inserted; a lower mold for supporting a lower side of the rotor core; a first plurality of fixing members provided on an inner wall of the upper mold and supporting one end of each of the permanent magnets; and a second plurality of fixing members provided on an inner wall of the lower mold and supporting the other end of each of the permanent magnets.

In some exemplary embodiments, the first and second fixing members may be a fixing pin for supporting one end of the permanent magnet in the axial direction or a spring pin for supporting the other end of the permanent magnet in the axial direction, and one of the upper mold and the lower mold may include the fixing member configured as a fixing pin and the other mold may include the fixing member configured as a spring pin.

In another aspect, the present invention provides a method for fixing permanent magnets of a rotor, the method comprising: inserting a permanent magnet into each of a plurality of magnet insertion apertures formed in a circumferential direction of a rotor core; and disposing the rotor core, into which the permanent magnets are inserted, between an upper mold and a lower mold so that the permanent magnets are aligned and fixed at predetermined positions by a first fixing member of the upper mold and a second fixing member of the lower mold.

In an exemplary embodiment, the method may additionally include filling a fixing agent in the magnet insertion apertures, into which the permanent magnets are inserted, so that the permanent magnets are fixed in the magnet insertion apertures of the rotor core. Additionally, in some exemplary embodiments, the fixing agent maybe made of a resin material.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1A:
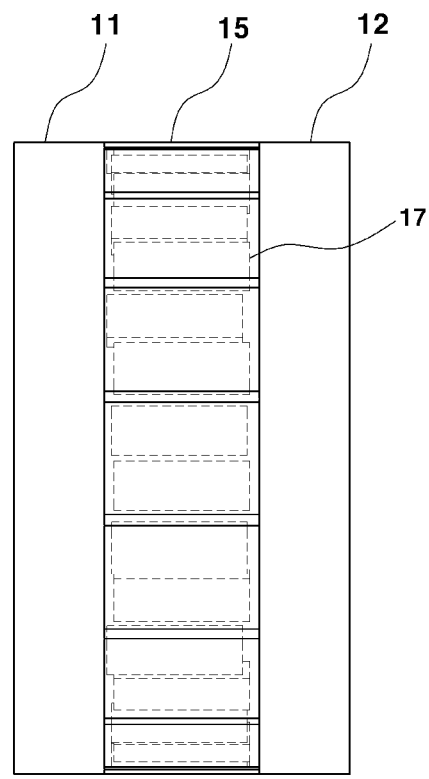
FIG. 1A-B is a schematic diagram showing a process of injecting a resin into a space between a rotor core and permanent magnets through a mold according to a prior art.
Figure 1B:
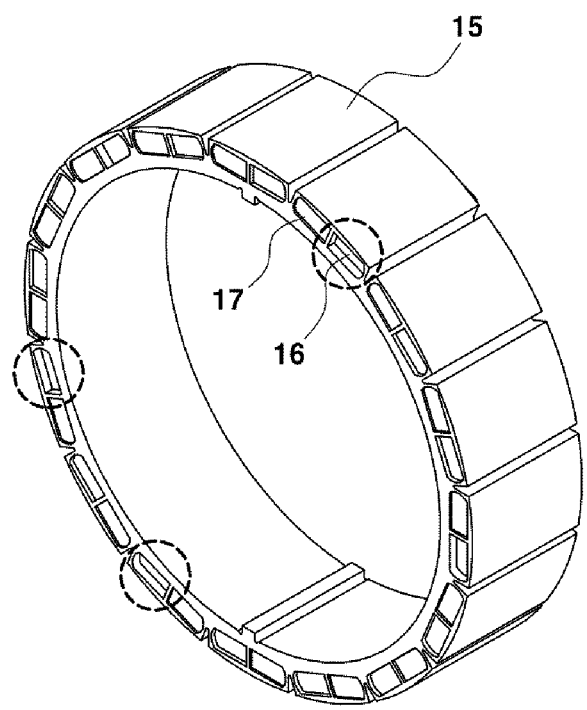

Reference numerals set forth in the Drawings includes reference to the following elements as further discussed below:

| | |
|---|---|
| 11: upper mold | 12: lower mold |
| 13: first fixing member (or fixing pin of upper mold) | |
| 14: second fixing member (or spring pin of lower mold) | |
| 15: rotor core | 16: magnet insertion aperture |
| 17: permanent magnet | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention provides a molding apparatus and method for fixing permanent magnets in a rotor core by injecting a resin into a space between the rotor core and the permanent magnets through a mold, in particular, in such a manner that a fixing member for fixing the positions of the permanent magnets is provided in the mold such that the permanent magnets inserted into the magnet insertion apertures are aligned at the same positions with respect to the axial direction of the rotor core.

Figure 2:
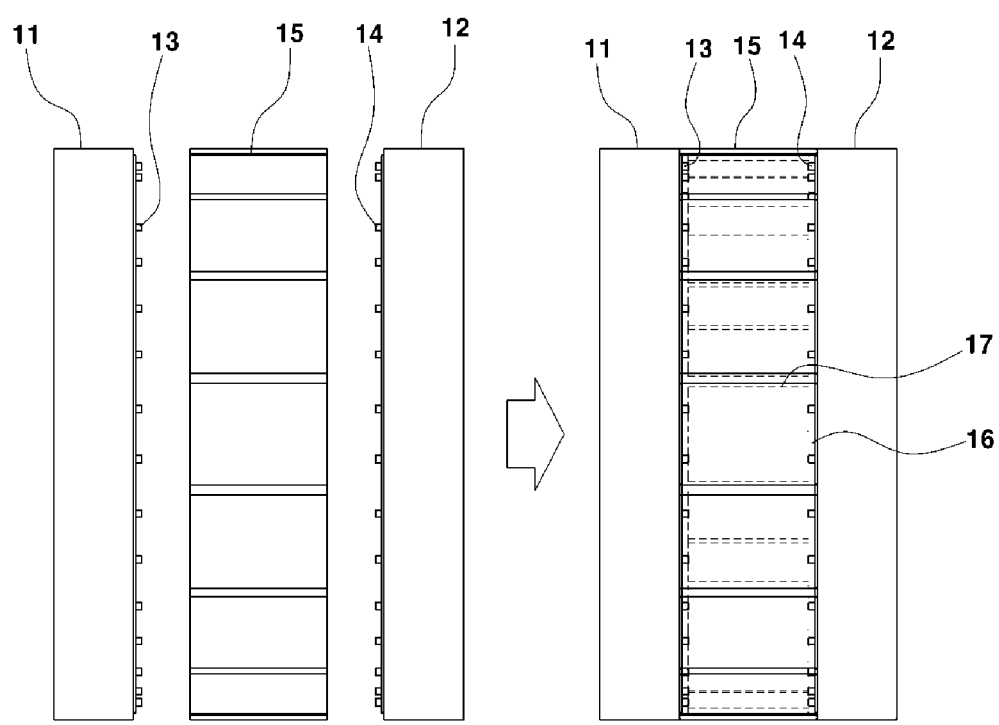
FIG. 2 is a schematic diagram showing the configuration of a mold apparatus for fixing permanent magnets by injecting a resin into a space between a rotor core and permanent magnets according to the present invention.
Figure 3A:
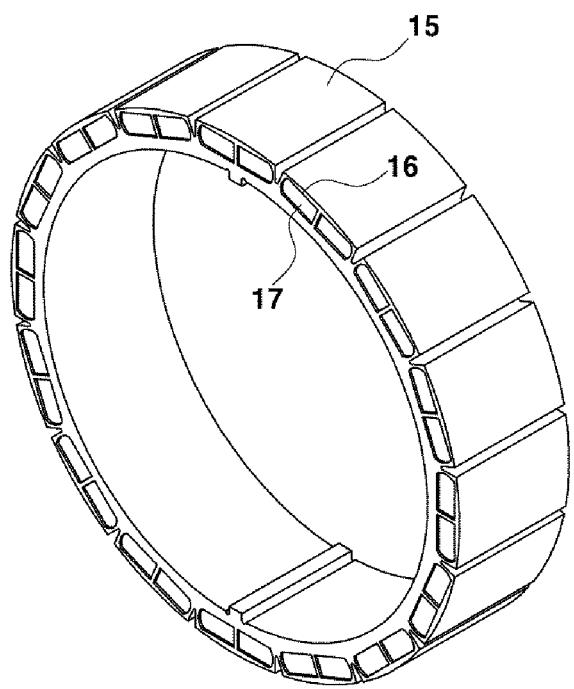
FIGS. 3A-B is a schematic diagram showing the alignment of permanent magnets fixed in a rotor core according to the present invention.
Figure 3B:
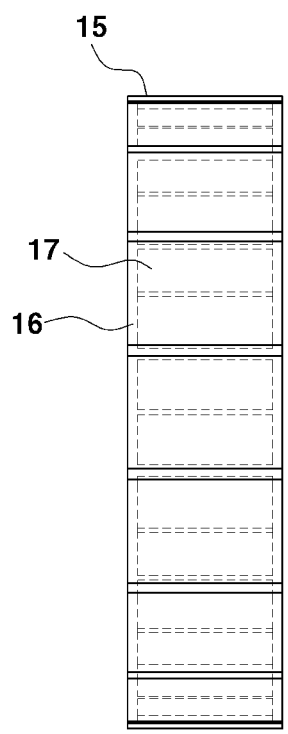

FIG. 2 shows the configuration of a mold apparatus for fixing permanent magnets according to the present invention, and FIGS. 3A-B shows a rotor core in which the permanent magnets are embedded by the mold apparatus.

As shown in FIG. 2, the molding apparatus for fixing permanent magnets includes an upper mold 11 that supports an upper side of a rotor core 15 and a lower mold 12 disposed on the opposite side of the upper mold 11 and that supports a lower side of the rotor core 15, and the upper mold 11 and the lower mold 12 include fixing members 13 and 14 that align and fix permanent magnets 17, respectively.

The rotor core 15 includes a plurality of magnet insertion apertures 16 formed in the circumferential direction thereof and is disposed between the upper mold 11 and the lower mold 12, and the permanent magnet 17 having a size smaller than that of the magnet insertion aperture 16 is inserted into each of the magnet insertion apertures 16.

The size of permanent magnet 17 provides a space for injecting a fixing agent into an area between the permanent magnet 17 and the rotor core 15 once the permanent magnet 17 is inserted into the magnet insertion aperture 16 of the rotor core 15 and is provided to have a size smaller than that of the magnet insertion aperture 16 with respect to the axial direction and the circumferential direction (of the rotor core) to prevent the permanent magnet 17 from being broken by components to be connected to both sides (upper and lower sides) of the rotor core 15 later (see FIG. 3).

As the fixing agent, a resin material that can be filled in a space between the rotor core 15 and the permanent magnets 17, i.e., in the remaining space of the magnet insertion apertures 16, into which the permanent magnets 17 are inserted, is used to fix the permanent magnets 17 in the magnet insertion apertures 16 during curing.

The first and second fixing members 13 and 14 provided on the upper mold 11 and the lower mold 12 may be configured as a fixing pin for supporting one end (or the opposite end) of each permanent magnet 17 in the axial direction and a fixing spring for elastically supporting the opposite end (or one end) of each permanent magnet 17 in the axial direction, respectively.

In the example of FIG. 2, a plurality of fixing pins 13 are provided on the inner wall of the upper mold 11 and a plurality of spring pins 14 are provided on the inner wall of the lower mold 12. More specifically, the plurality of fixing pins 13 are formed to project from the inner wall of the upper mold 11 toward the lower mold 12 (or downwardly) and the plurality of spring pins 14 are formed to project from the inner wall of the lower mold 12 toward the upper mold 11 (or upwardly).

Here, when the rotor core 15 is disposed between the upper mold 11 and the lower mold 12, the fixing pins 13 and the spring pins 14 are directed toward the magnet insertion apertures 16 of the rotor core 15 to support the permanent magnets 17, inserted into the magnet insertion apertures 16, from both sides in the axial direction, thus allowing the permanent magnets 17 to be aligned in identical positions around the entire circumference of the motor. Moreover, the fixing pins 13 and the spring pins 14 have the same number as the magnet insertion apertures 16 of the rotor core 15 and are arranged at regular intervals to be located at the same positions as the magnet insertion apertures 16.

Although not shown in the figures, as another example, the spring pins may be provided on the inner wall of the upper mold and the fixing pins may be provided on the inner wall of the lower mold. That is, a fixing member 13 including the fixing pins may be provided on one of the upper mold 11 and the lower mold 12, and a fixing member 14 including the spring pins may be provided on the opposite mold such that the permanent magnets 17, inserted into the magnet insertion apertures 16 of the rotor core 15, can be aligned in identical predetermined positions with respect to the axial direction.

In other words, the fixing members 13 and 14 of the upper mold 11 and the lower mold 12 support both ends of the permanent magnets 17 to restrict the displacement of the permanent magnets 17 during injection of the fixing agent, thus allowing the permanent magnets 17, inserted into the rotor core 15, to be aligned at the same positions in the axial direction as shown in FIG. 3.

Next, the method for fixing the permanent magnets 17 in the magnet insertion apertures 16 of the rotor core 15 using the molding apparatus for fixing permanent magnets according to the present invention will be described.

First, the permanent magnets 17 are inserted into the plurality of magnet insertion apertures 16 provided in the rotor core 15, and the resulting rotor core 15 (with the permanent magnets inserted) is disposed between the upper mold 11 and the lower mold 12. Here, the rotor core 15 is loaded between the upper mold 11 and the lower mold 12 such that the magnet insertion apertures 16 and the permanent magnets 17 are located between the fixing member 13 of the upper mold 11 and the fixing member 14 of the lower mold 12 and, when the upper mold 11 (or lower mold) moves toward the lower mold 12 (or upper mold) such that the upper mold 11 and the lower mold 12 support the upper side and the lower side of the rotor core 15, the spring pins as the fixing member 14 of the lower mold 12 push the permanent magnets 17 toward the fixing pins as the fixing member 13 of the upper mold 11 by their spring force, thus elastically supporting the permanent magnets 17.

In other words, one end of the permanent magnet 17 is supported by the fixing pin 13 and, at the same time, the other end of the permanent magnet 17 in the longitudinal direction is elastically supported by the spring pin 14 such that the displacement of the permanent magnet 17 is restricted, thus allowing all the permanent magnets 17, inserted into the magnet insertion apertures 16 of the rotor core 15, to be aligned at the same positions in the axial direction.

That is, the fixing members 13 and 14 provided on the upper mold 11 and the lower mold 12 allow the permanent magnets 17, inserted into the magnet insertion apertures 16 of the rotor core 15, to be fixed at identical predetermined positions around the circumference of the rotor, and thus the permanent magnets 17 are all aligned at the same positions in the axial direction.

Accordingly, the permanent magnets 17, inserted into the magnet insertion apertures 16 of the rotor core 15, are all aligned at the same positions with respect to the axial direction and, in this state, a fixing agent is filled in the magnet insertion apertures 16 such that the permanent magnets 17 are fixed in the magnet insertion apertures 16.

Additionally, the fixing agent may be injected through an injection port, not shown, of the lower mold 12 (or upper mold) and supplied to the magnet insertion apertures 16 into which the permanent magnets are inserted. That is, the fixing agent may be injected into the surrounding space of the permanent magnets 17, i.e., into the remaining space between the rotor core 15 and the permanent magnets 17 to fill the space and then cured, thus allowing the permanent magnets 17 to be fixed to the rotor core 15.

The above-described method for fixing permanent magnets according to the present invention allows the permanent magnets 17, inserted into the magnet insertion apertures 16 of the rotor core 15, to be aligned and fixed at the same positions in the axial direction, thus achieving the following effects.

1. The electromagnetic properties of the motor are improved to reduce the electromagnetic torque ripple, which makes it possible to improve the motor control performance and reduce the electromagnetic noise (whine noise).

2. The unbalance of the rotor assembly is reduced, which makes it possible to reduce or eliminate the process for solving the imbalances associated with the rotor assembly, reduce the manufacturing cost, and reduce NVH.

3. The embedding of the permanent magnets is improved, which makes it possible to increase the durability of the drive motor and the mass-productivity as well.

As described above, according to the molding apparatus and method for the fixing permanent magnets or the rotor in accordance with the present invention, it is possible to align the permanent magnets, inserted into the rotor core of the drive motor, at the same positions with respect to the axial direction of the rotor core such that the positions of the permanent magnets in the axial direction coincide with each other, thus improving the performance of the drive motor.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for fixing permanent magnets of a rotor, the method comprising:
　inserting a permanent magnet into each of a plurality of magnet insertion apertures formed in a circumferential direction of a rotor core;
　disposing the rotor core, into which the permanent magnets are inserted, between an upper mold and a lower mold such that the permanent magnets are aligned and fixed at predetermined positions by a first plurality of fixing members provided on an inner wall of the upper mold and a second plurality of fixing members provided on an inner wall of the lower mold, such that the first plurality of fixing members support one end of each of the permanent magnets and the second plurality of fixing members support an opposite end of each of the permanent magnets; and filling a fixing agent in the magnet insertion apertures by injecting the fixing agent into a space between the rotor core and the permanent magnets through one of the upper mold and the lower mold, the fixing agent being supplied into the magnet insertion apertures into which the permanent magnets are inserted, such that the permanent magnets are fixed in the magnet insertion apertures of the rotor core.

2. The method of claim 1, wherein the fixing agent is made of a resin material.

3. The method of claim 1, wherein each of the first plurality of fixing members is a fixing pin that supports the one end of each of the permanent magnets in an axial direction.

4. The method of claim 1, wherein each of the second plurality of fixing members is a spring pin that supports the opposite end of each of the permanent magnets in an axial direction.

5. The method of claim 1, wherein each of the first plurality of fixing members in the upper mold is a fixing pin, and each of the second plurality of fixing members in the lower mold is a spring pin.

6. The method of claim 1, wherein the first plurality of fixing members and the second plurality of fixing members are provided in a same number as the magnet insertion apertures and arranged at regular intervals so as to be located at positions corresponding to the magnet insertion apertures.

\* \* \* \* \*